Inventors
Erich Breuer
Otto Smuda

United States Patent Office 3,504,899
Patented Apr. 7, 1970

3,504,899
MELTING OR HOLDING FURNACE STRUCTURE UTILIZING PRESSURIZED GAS FOR DISCHARGE OF MOLTEN MATERIAL
Erich Breuer, Holzen, and Otto Smuda, Holzwickede, Germany, assignors to Aktiengesellschaft Brown, Boveri & Cie, Baden, Switzerland, a joint-stock company
Filed Nov. 20, 1967, Ser. No. 684,101
Claims priority, application Germany, Nov. 21, 1966, B 89,920
Int. Cl. F27d 3/14
U.S. Cl. 266—38                                 6 Claims

ABSTRACT OF THE DISCLOSURE

A stationary melting or holding furnace is provided with a pouring pipe starting at the bottom of the furnace chamber containing the molten material and which extends above the maximum height of the charge in the chamber. A discharge pipe is branched off from the pouring pipe at a level below the maximum height of charge in the chamber from which the molten material is withdrawn in a predetermined quantity by application of a pressurized gas to the surface of the molten material in the chamber, and the pressure of this gas is regulated after each withdrawal operation by measuring the height of the molten material in the pouring pipe. This latter height measurement can be made by means of a manometer located at the closed-off top of the pouring pipe, or the latter can be left open at the top and a filling level indicator in the form of an isotope switch, for example, used to measure the height.

The present invention relates to an improved apparatus for the repeated withdrawal of equal amounts of material from a stationary melting- or holding furnace with a delivery pipe, starting in the proximity of the bottom and rising above the maximum height of charge by a pressure gas acting in the furnace chamber on the surrface of the molten material.

The use of delivery units working with pressure gas, with uptakes extending above the melt, which have been known for a long time in foundries, permits the convenient and safe filling of the melt. Such a delivery unit is described in German patent publication DAS 1,156,539, with which at the same time the amount of material to be delivered can be dosed. In this unit, the amount of metal to be withdrawn can be determined by hand with a regulatable pressure-reducing valve in connection with a three way cock in the pressure gas line, depending on the amount of pressure gas, the degree of filling of the furnace being indicated by a manometer. Since the amount of material to be withdrawn is regulated in this unit by an operator, the accuracy of the dosing depends on his attention. In order to be able to withdraw exactly measured amounts of material, independent of the respective height of charge of the furnaces, dosing devices have been installed in the furnaces. Such a device is described, for example, in German patent publication DAS 1,180,091. The dosing device has at its bottom an inlet port, to which is connected a vertical filling pipe line, which has about the same height as the surface of the molten metal in the furnace chamber. In the proximity of the bottom of the dosing device is provided in addition an outlet port which is connected with an obliquely rising discharge pipe extending above the maximum height of charge of the furnace chamber, which passes through the furnace wall. For filling and emptying the dosing device, a vacuum and an overpressure are alternately produced by a blower which is connected with the pipe lines and a reversing switch. When using this device, which operates without any moving parts arranged in the material to be molten, like pistons, pumps and valves, it is a disadvantage that the furnace chamber must be selected larger than would ordinarily be necessary. The furnace is thus more expensive in the manufacture and in its operation, due to the higher heating costs, than a correspondingly smaller furnace. Another disadvantage can be seen in the fact that a certain time passes after each withdrawal of material, due to the refilling of the melt in the dosing device to a normal level, until material can be delivered again.

The object of the invention is to provide an apparatus which makes it possible to keep the melt in the pouring pipe always at the same level, independent of the height of charge in the furnace, so that the same amounts of material can be withdrawn from the furnace practically continuously by use of a timing pulse generator.

This object is achieved according to the invention by an apparatus wherein the gas pressure admitting the melt in the furnace chamber is regulated after each withdrawal by a measuring instrument arranged on the pouring pipe.

For carrying out the invention, an apparatus is used where the pouring pipe extending above the maximum height of charge of the furnace is closed at the top, with the exception of a bore for the manometer, a discharge pipe is branched off below the maximum height of charge of the furnace, and a manometer is arranged on the pouring pipe.

In another embodiment of the apparatus according to the invention, the pouring pipe extending above the maximum height of charge of the furnace can remain open at the top, a discharge pipe is branched off from the pouring pipe below the maximum height of the furnace, and a filling level gauge of known design, for example, an isotope limiting switch, is arranged on the pouring pipe at the maximum height of charge of the furnace.

In a further development of the invention, the latter is mounted detachably on the pouring pipe to facilitate the cleaning and to replace the discharge pipe.

In order to protect the areas of the discharge pipe which are subject to the greatest wear, a nozzle block is arranged, according to the invention, on the discharge pipe at the end nearest the pouring pipe, and a pouring block is located at the other discharge end of the discharge pipe.

The foregoing as well as other objects and advantages inherent in the invention will become more apparent from the following detailed description of one suitable embodiment thereof and from the accompanying drawings wherein.

Figure 1:
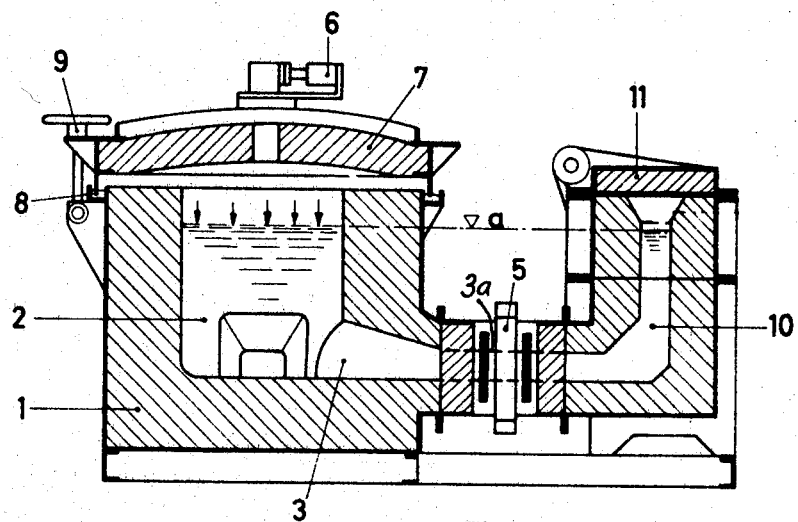
FIG. 1 illustrates the improved holding furnace in vertical central section along line I–I of FIG. 2.

With reference now to the drawings, the furnace 1 which is of the holding type is seen to be provided with a chamber 2 in which the melt is held, there being an inlet port structure 3 and an outlet port structure 4 for the furnace chamber, both of which are located close to the bottom of the chamber. For keeping the melt at the prescribed temperature, an annular inductive type heating device 5 surrounds a short duct 3a leading to the inlet port 3, and energization of the heating device 5 is controlled by means of a temperature sensing device 6 mounted on the cover member 7 for the furnace chamber. Cover 7 rests upon a peripherally extending packing cup 8 and is sealed tightly in place by means of a plurality of circumferentially spaced, pivotally mounted locking bolts 9.

A vertical filling shaft 10, which is provided with a hinged cover 11 to prevent the melt in the filling shaft from cooling off too rapidly, is located laterally of the main furnace chamber 2, and melt is discharged from the bottom of shaft 10 into the short duct 3a and thence flows through the annular inductive heating device 5 and into the inlet port 3.

Figure 3:
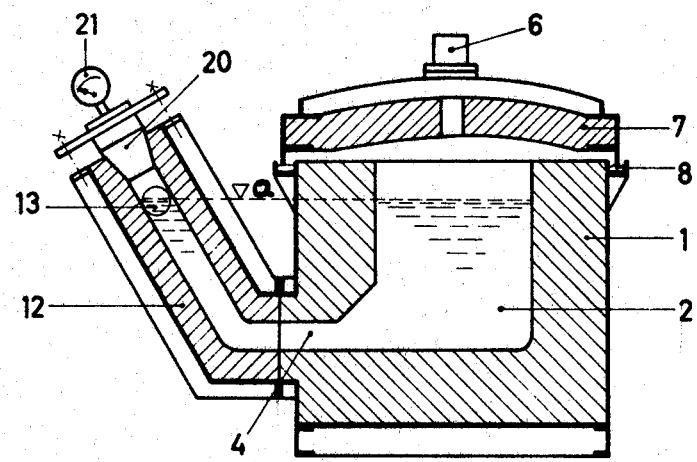
FIG. 3 is a vertical sectional view on line II–II of FIG. 2.
Figure 4:
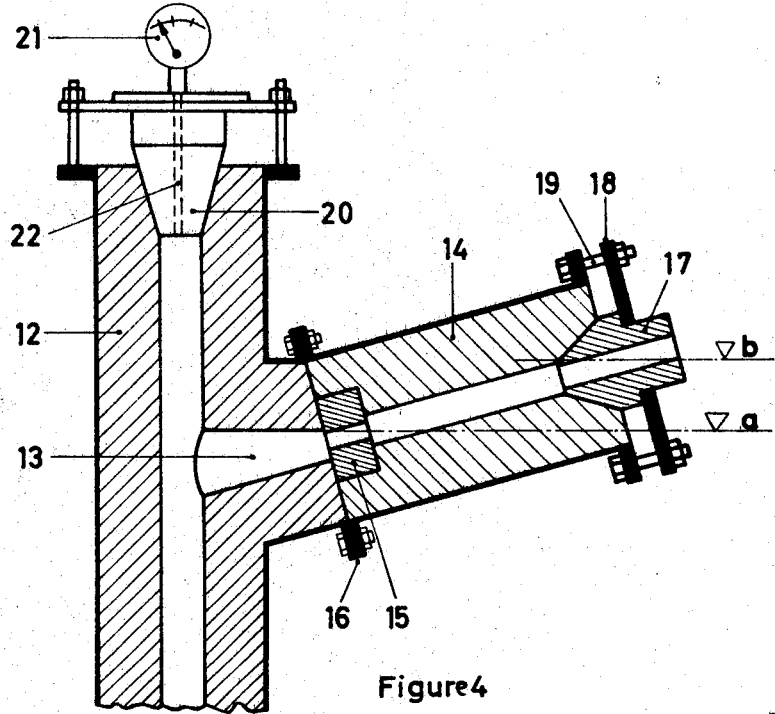
FIG. 4 is a vertical sectional view on line III–III of FIG. 2.

As seen in FIG. 3, a pouring pipe 12 extends upwardly from outlet port 4 at an angle and has a height greater than the maximum height of any charge which can be contained in the furnace chamber 2. This maximum height of charge is indicated in FIG. 3 by line a. Pouring pipe 12 is provided with a lateral discharge opening 13 directly under the maximum charge line a to which is connected a slightly rising discharge pipe 14, as seen in FIG. 4, and through which the melt leaves the furnace at a level indicated by line b, which is above line a. Discharge pipe 14 is provided at its inner end with a nozzle block 15 having an axial through bore, and is secured in place on a nippled part of pouring pipe 12 by means of a coupling flange 16. At the outer end of discharge pipe 14 is located a pouring block 17 having an axial bore and which is retained in place on a flange of pipe 14 by means of an annular disc 18 and a plurality of circumferentially located bolts 19 which connect with this flange.

The pouring pipe 12 is fitted with a stopper plug 20 at its upper end, and a manometer 21 is carried by this plug. Plug 20 is retained in place to close off the upper end of the bore of pipe 12 by means of a pressure plate and circumferentially spaced bolts which hold the plate to a flange at the upper end of pipe 12. An axial bore 22 provided in plug 20 serves to place the manometer in communication with the interior of pouring pipe 12.

Figure 2:
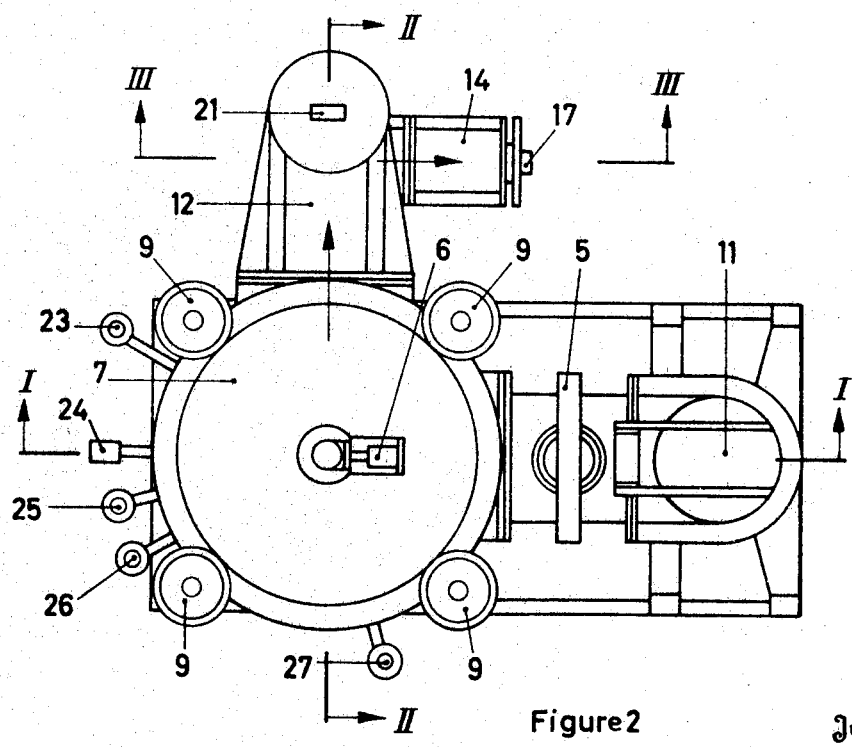
FIG. 2 is a view of the improved furnace in top plan.

As seen in FIG. 2, a safety valve 23 is located on the furnace above the melt level and a filling level indicator 24 is also provided. The latter monitors the content of the furnace and gives off a signal when additional melt material is to be charged into the furnace. Moreover, the chamber 2 of furnace 1 is also connected in the proximity of the cover with two inlet valves 25, 26 which are respectively connected with pressure generators, not shown, and is provided also with an outlet valve 27. If a protective gas is utilized, the latter can be connected through a return pipe with a collecting tank. One inlet valve 25 is provided for the pressure gas which, controlled by means of a time-pulse generator, moves the melted material out of the furnace through pipes 12 and 14. Through the other inlet valve 26 flows the gas for keeping the melt in the pouring pipe 12 at the same level in between successive withdrawal operations.

The improved holding furnace arrangement operates in the following manner.

When the holding furnace 1 has been charged to the maximum height a, with the outlet valve 27 for the pressure gas open, the melt material in pouring pipe 12 and in filling shaft 10 is also at the same level. Due to the atmosphere compressed in the upper part of pouring pipe 12, which acts on manometer 21, the measuring mechanism of manometer 21 assumes a position where inlet valve 26 is closed over known switching means. Controlled by a time pulse generator, a gas pressure is now exerted over the other inlet valve 25 on the melt level in furnace chamber 2, which corresponds to the amount of material to be poured. The melt thus rises in pouring pipe 12 and issues through discharge pipe 14. After the pouring process is completed, the surface of the melt drops in furnace chamber 2, pouring pipe 12 and filling shaft 10 by the quantity of material delivered. The pressure of the trapped atmosphere acting on the manometer diminishes, since the atmosphere can expand again. The shifted measuring mechanism of manometer 21 thus influences switching means which open inlet valve 26. The incoming pressure gas lowers the melt in furnace chamber 2, which rises again in pouring pipe 12 and filling shaft 10. When the melt has again reached the level in pouring pipe 12, which corresponds to the maximum height of charge a, inlet valve 26, controlled by manometer 21, is closed. The next pouring process can only be started by connecting the time pulse generator over inlet valve 25. After its completion, the melt rises again in pouring pipe 12, as described above.

If another filling level indicator, for example, an isotope limiting switch, is used in pouring pipe 12 instead of manometer 21, such a switch being described in U.S. Patent No. 3,279,001 granted Oct. 18, 1966, the process of raising the melt in pouring pipe 12 is practically the same. If the melt in the pouring pipe is below the isotope limiting switch, valve 26 remains open until the melt has reached the level of the isotope limiting switch.

Naturally the manometer 21 arranged on pouring pipe 12 can also be used for filling the melt into furnace chamber 2 with a corresponding connection with known switching means and the inlet valves 25, 26 as well as outlet valve 27.

The advantage achieved with the invention is that, instead of one of the known complicated devices, the melt in the pouring pipe can be kept constantly at the same level between the individual pouring operations with a simple measuring device arranged on the pouring pipe, with the suggested design of the latter, over known means, independent of the height of charge so that the same amount of material can always be withdrawn, if a permanently set time pulse generator is used.

We claim:

1. A melting or holding furnace structure comprising a furnace chamber containing the molten material, a pouring pipe extending upwardly from the bottom portion of said chamber above the maximum height of the charge in said chamber, the top of said pouring pipe being closed except for a bore leading to a manometer supported on said pouring pipe, a discharge pipe branched off from said pouring pipe at a level below the maximum height of charge in said chamber, means for admitting a pressurized gas into said chamber to force out a predetermined amount of molten material through said discharge pipe, and means controlled by said manometer for regulating the pressure of said gas after each discharge of molten material from said chamber.

2. A melting or holding furnace structure as defined in claim 1 wherein said discharge pipe is detachably mounted on said pouring pipe.

3. A melting or holding furnace structure as defined in claim 2 and which further includes a nozzle block located at the inlet end of said discharge pipe, and a pouring block located at the outlet end of said discharge pipe.

4. A melting or holding furnace structure comprising a furnace chamber containing molten material, a pouring pipe extending upwardly from the bottom portion of said chamber above the maximum height of the charge in said chamber, said pouring pipe being open at the top, a discharge pipe branched off from said pouring pipe at a level below the maximum height of charge in said chamber, a filling level indicator such as an isotope limit switch arranged on said pouring pipe for measuring the height of the molten material therein, means for admitting a pressurized gas into said chamber to force out a predetermined amount of molten material through said discharge pipe, and means controlled by said filling level indicator for regulating the pressure of said gas after each discharge of molten material from said chamber.

5. A melting or holding furnace structure as defined in claim 4 wherein said discharge pipe is detachably mounted on said pouring pipe.

6. A melting or holding furnace structure as defined in claim 5 and which further includes a nozzle block located at the inlet end of said discharge pipe, and a pouring block located at the outlet end of said discharge pipe.

References Cited

UNITED STATES PATENTS

| | | | |
|---|---|---|---|
| 2,939,899 | 6/1960 | Edstrand et al. | |
| 3,184,226 | 5/1965 | Sherman | 266—38 |
| 3,191,247 | 6/1965 | Holz | 266—38 X |

J. HOWARD FLINT, Primary Examiner

J. S. BROWN, Assistant Examiner

U.S. Cl. X.R.

75—46